United States Patent [19]
Pühringer et al.

[11] Patent Number: 4,804,408
[45] Date of Patent: Feb. 14, 1989

[54] A MILL ARRANGEMENT AND A PROCESS OF OPERATING THE SAME USING OFF GASES TO REFINE PIG IRON

[75] Inventors: Othmar Pühringer; Felix Wallner; Horst Wiesinger, all of Linz; Ernst Eichberger, Pichl/Wels; Wilhelm Schiffer, Traun; Walter Rockenschaub, Linz, all of Austria

[73] Assignee: Voest-Alpine Aktiengesellschaft, Linz, Austria

[21] Appl. No.: 81,648

[22] Filed: Aug. 4, 1987

[30] Foreign Application Priority Data

Aug. 12, 1986 [EP] European Pat. Off. ....... 86 890 229.7

[51] Int. Cl.$^4$ .................................... C21B 13/14
[52] U.S. Cl. .................................... 75/38; 75/40; 75/43; 75/59.18; 266/143; 266/156; 266/160; 266/165
[58] Field of Search ............... 75/38, 40, 43, 44 R, 75/44 S, 59.18; 266/160, 143, 156, 165

[56] References Cited

U.S. PATENT DOCUMENTS 4,419,128  12/1983  Nakagawa et al. ............... 75/46
4,690,387  9/1987   Rockenschaub et al. ......... 75/59.18

FOREIGN PATENT DOCUMENTS 0167895  6/1985  European Pat. Off. .

OTHER PUBLICATIONS

*Direct Reduced Iron* TN707D56 Aug. 82, pp. 115–118.

Primary Examiner—Melvyn J. Andrews
Attorney, Agent, or Firm—Hopgood, Calimafde, Kalil, Blaustein & Judlowe

[57] ABSTRACT

In the operation of mills for the production of steel from molten pig iron and solid ferrous carriers, it is sought for economic reasons to increase the portion of solid ferrous carriers. To supply thermal carriers, such as fossil fuels, as is known, involves the disadvantages of extended charging times and of undesired accompanying elements introduced into the process.

To avoid these disadvantages, the invention provides for a combination of at least one steel converter with a direct reduction plant, a meltdown gasifier and a cupola. Therein, sponge iron discharged from the direct reduction plant is melted to pig iron in the meltdown gasifier, on the one hand, and is used as solid charge for the converter. Scrap, together with coke, is melted in the cupola to blown metal, the latter, together with the pig iron produced in the meltdown gasifier, being supplied to the converter as liquid charge.

2 Claims, 1 Drawing Sheet

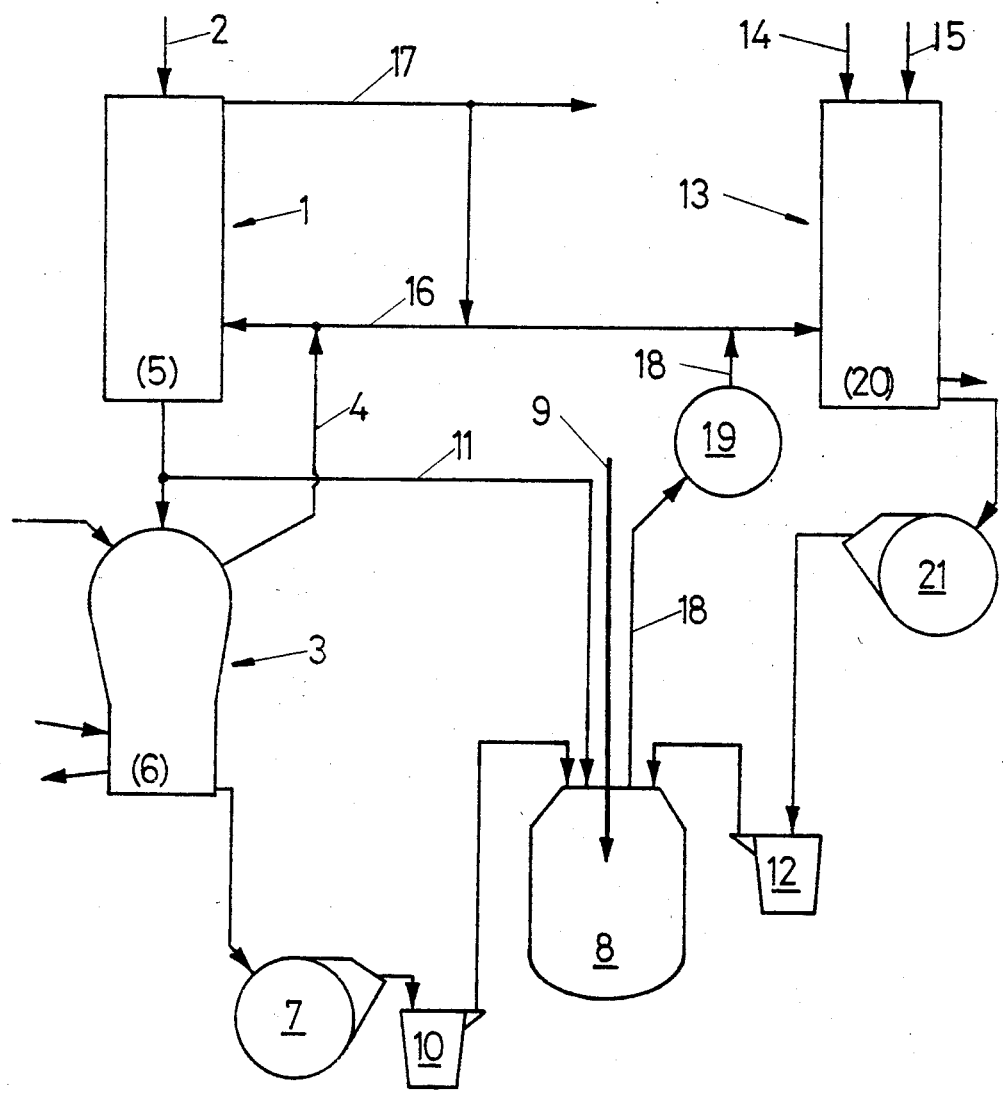

A MILL ARRANGEMENT AND A PROCESS OF OPERATING THE SAME USING OFF GASES TO REFINE PIG IRON

The invention relates to a mill for the production of steel from ores and other solid ferrous carriers, such as scrap, as well as to a method of operating such a mill.

In conventional mills, which produce steel in steel converters by top blowing oxygen onto and/or blowing oxygen into molten pig iron, the pig iron is produced in blast furnaces by using ores and high-quality coke. Since the pig iron production in large blast furnaces is the most economic, developments have tended to go into the direction of blast furnaces with the highest outputs, which must be operated over periods of time as long as possible without interruption. When using such blast furnaces, large amounts of pig iron must be taken over by the steelworks, i.e., a plurality of high-capacity steel converters is required to process the pig iron. Storage of the molten pig iron produced is possible to a limited extent only. Casting of molten pig iron to pigs during interruptions in the steelworks operation or during operational failures is uneconomic.

Beside molten pig iron, solid ferrous carriers, primarily scrap, are used as charge in converter operation. Without supply of additional heat, i.e., if the refining process is to run autothermally, scrap can be used to a limited extent only. Depending on the prices of scrap and pig iron, it may be of interest to vary the portion of scrap in the charge in order to keep charging costs low.

A way of attaining higher scrap rates is to supply to the charge additional heat carriers in the form of fossil fuels. With converters operating according to the oxygen top blowing method, it is known to increase the scrap rate in the converter by preheating the scrap by means of a burner lance before the refining process proper. Likewise, it is known with bottom-blowing converters, to inject thermal carriers through bottom tuyeres and partially burn a second time the carbon monoxide containing gas formed in the converter, above the charge in order to elevate the scrap rate. However, processes of this type involve extended charging times, thus resulting in a reduced productivity. Also, undesired accompanying elements, such as sulfur, are introduced into the process by the supply of fuels. Moreover, large amounts of offgas are formed, which must be conveyed to other processes for utilization.

From EP-A1-No. 0 167 895 a process for the production of steel from scrap is known, in which the carbon monoxide rich offgas forming during refining of pig iron to steel is supplied to a cupola charged with scrap and coke and is burnt in an exothermic reaction in the zone of the tuyeres of the cupola. The scrap is smelted and carburized and the pig iron produced in this way is supplied to the refining vessel, where it is refined to steel without further heat supply. With this process, the energy consumption is relatively low, yet it is not flexible with regard to the choice of the ratio of pig iron to scrap, because it departs exclusively from scrap as base material. In addition, the price of scrap is subject to high fluctuations depending on the actual economic status.

The invention aims at avoiding the disadvantages and difficulties pointed out and has as its object to provide a mill as well as a process of operating the same, by which the production of high-purity steel from lumpy ores and other ferrous carriers is feasible, wherein molten pig iron is made available in an economic way and without high investment costs, solid ferrous carriers may be used additionally in amounts varying within wide limits, all the aggregates are flexible in mutual adaptation of their performances, and even the incurring offgases may be optimally utilized.

This object of the invention is achieved by combining a direct reduction plant, in particular a direct reduction shaft furnace, for the production of sponge iron with a meltdown gasifier, one or several steel converters, and a cupola, wherein the direct reduction plant, on its extraction side, communicates with both the meltdown gasifier and the converters via transporting means for sponge iron, the cupola communicates with the converters via transporting means for liquid blown metal, and the meltdown gasifier communicates with the converters via transporting means for molten pig iron.

Preferably, temporary vessels for pig iron from the meltdown gasifier and for blown metal from the cupola are provided.

According to a particular embodiment, the offgas ducts of the direct reduction plant and of the meltdown gasifier as well as the offgas duct of the steel converters communicate in a duct-like manner.

The process according to the invention, of operating the mill comprises introducing lumpy oxidic ferrous carriers into the reduction zone of the direct reduction plant and reducing them by reduction gas produced in the meltdown gasifier from coal and oxygen-containing as, for one part, introducing the reduced product—sponge iron—in a hot state into the melting zone of the meltdown gasifier, heating, liquefying and carburizing it there, with molten pig iron forming, for the other part, transferring the reduced product outward of the direct reduction plant, charging it into the converter(s) as solid charge, charging scrap commonly with coke into the cupola and liquefying it to blown metal, charging molten pig iron from the meltdown gasifier commonly with blown metal from the cupola into the steel converter(s) and refining it, wherein offgas from the direct reduction plant, gas from the meltdown gasifier and offgas from the steel converters or a mixture of these gases are used as fuel to operate the cupola.

As compared to conventional mills using a blast furnace as pig iron producer, the plant according to the invention has the advantage that it may be started and stopped without any problems and that wide range variations in terms of the charging substances used for the production of steel are possible.

The invention will be explained in more detail by way of the accompanying flow sheet.

A direct reduction plant 1, preferably a reduction shaft furnace, is charged with lumpy ore from a charging means 2. The shaft furnace is connected with a meltdown gasifier 3, in which, from coal and oxygen-containing gas, a reduction gas is produced, which is fed to the reduction shaft furnace via a duct 4.

In the shaft furnace, the lumpy ore is reduced to sponge iron 5. The sponge iron partially is supplied to the meltdown gasifier and is smelted in the meltdown zone to pig iron 6. The molten pig iron is collected in a temporary vessel 7, for instance, a pipe ladle.

The plant according to the invention comprises a steel converter 8, which, in the present case, is designed as an oxygen top-blowing converter and is operated with an oxygen lance 9 led from top into the converter.

The converter is charged with molten pig iron from the temporary vessel 7, for instance, with the help of transporting ladles 10. Part of the converter burden is comprised of sponge iron, which is diverted from the shaft furnace with the help of a conveying means 11.

In the cupola 13, solid ferrous carriers 14, primarily scrap, together with carbon carriers 15 are smelted and liquefied. The heat necessary thereto is recovered from the reduction gas (duct 16), top gas (duct 17), from the converter offgas or from a mixture of these gases. The converter offgas may be drawn off through duct 18 and collected in a gas reservoir 19.

The liquid blown metal 20 obtained in the cupola 13 is collected in a temporary vessel 21 and is supplied to the steel cnnverter 8 by transporting ladles 12.

It is also possible to use just one temporary vessel instead of the two temporary vessels 7 and 21, with a mixed metal charge being obtained from the pig iron of the meltdown gasifier and the blown metal of the cupola.

A typical exemplary embodiment of the process according to the invention when using a 40 ton top-blowing converter is the following:

45.5 t/h sponge iron having a composition of 89.0% Fe, 1.0% CaO, 3.9% $SiO_2$, 0.1% MnO, 1.0% $Al_2O_3$, 0.04% P, 0,08% S and 4.0% total carbon (1.5% $Fe_3C$, 2.5% elementary carbon) are produced from 62.9 t ore/h having a composition of 93.17% $Fe_2O_3$, 0.02% S, 0.14% $CO_2$, 1.03% CaO, 0.07% MnO, 2.84% $SiO_2$, 0,08% MgO, 0.67% $Al_2O_3$, 0.03% $P_2O_5$ and 0.80% balance portions in a direct reduction shaft furnace by using a reduction gas composed of 68.14% CO, 1.86% $CO_2$, 0.03% $CH_4$, 27.7% $H_2$, 1.68% $H_2O$, 0.35% $N_2$ and 0.24% $H_2S$.

One part thereof, i.e., 29.3 t/h, are supplied to the meltdown gasifier by feeding 36.1 t coal and 23251 $Nm^3$/h oxygen, and 16.2 t/h sponge iron are supplied to the converter. In the meltdown gasifier, pig iron in an amount of 27.8 t/h having a composition of 4.1% C, 1.0 Si, 0.07% Mn, 0.05% P and 0.03% S is obtained, which is stored in the temporary vessel 7 and is supplied to the converter in batches.

In the cupola, 27.8 t/h of blown metal having a composition of 3.6% C, 0.1% Si, 0.2% Mn, 0.02% P, 0.05% S, balance iron, are melted at a temperature of 1,400° C. from 29.3 t scrap having a composition of 0.15% C, 0.20% Si, 0.3% Mn, less than 0.02% P, less than 0.02% S, balance iron, and from 1.3 t/h coke. This blown metal is stored in the temporary vessel 21 and subsequently is supplied to the converter in batches. The converter has an output of 63.3 t/h, the refined steel has a composition of 0.04% C, 0.1% Mn, less than 0.02% P, less than 0.025% S and a temperature of 1,650° C.

To melt the blown metal in the cupola, top gas from the direct reduction furnace is used with this example; 13070 $Nm^3$/h of the gas emerging at a pressure of 4.4 bar are required. The excess amount of top gas, which incurs approximately fourth as much than necessary to operate the cupola, may be conducted to other consumers.

What we claim is:

1. A mill arrangement for producing steel from ore and other solids iron carriers, which mill arrangement comprises in combination a direct reduction plant for producing sponge iron and having a discharge side, a meltdown gasifier, at least one steel converter, a cupola, sponge iron transporting means provided on said discharge side of said direct reduction plant to connect said direct reduction plant to said meltdown gasifier and said at least one converter, liquid blown metal transporting means provided to connect said cupola with said at least one converter, molten pig iron transporting means to connect said meltdown gasifier with said at least one converter, a temporary vessel for receiving pig iron from said meltdown gasifier, a temporary vessel for receiving blown metal from said cupola, and offgas ducts connected to each of said direct reduction plant, of said meltdown gasifier, and of said at least one steel converter, said ducts intercommunicating and being connected to said cupola.

2. A process of operating a mill arrangement including in combination a direct reduction plant for producing sponge iron, a meltdown gasifier for producing pig iron, at least one steel converter, a cupola, sponge iron transporting means for connection of said direct reduction plant with said meltdown gasifier and said at least one converter, liquid blown metal transporting means for connection of said cupola with said at least one converter, and molten pig iron transporting means for connection of said meltdown gasifier with said at least one converter, said process comprising:

introducing lumpy oxidic ferrous carriers into the reducing zone of said direct reduction plant and reducing said lumpy oxidic ferrous carriers by reduction gas produced in said meltdown gasifier from coal and oxygen-containing gas so as to produce a reduced product comprised of sponge iron and produce an offgas, separating said sponge iron into a first sponge iron portion and a second sponge iron portion, introducing said first sponge iron portion in a hot state into the melting zone of said meltdown gasifier, heating, liquefying and carburizing said first sponge iron portion there so as to obtain molten pig iron and produce an offgas, extracting said second sponge iron portion from said direct reduction plant so as to provide a solid charge to be introduced into said at least one steel converter, charging scrap and coke into said cupola and liquefying so as to obtain blown metal, charging molten pig iron from said meltdown gasifier with blown metal from said cupola into said at least one steel converter and refining, and accumulating the said offgases from said direct reduction plant, from said meltdown gasifier and from said at least one steel converter, including a mixture of these gases, and feeding these gases as fuel to operate said cupola.

* * * * *